(12) United States Patent
Russ et al.

(10) Patent No.: US 6,973,590 B1
(45) Date of Patent: Dec. 6, 2005

(54) TERMINATING A CHILD PROCESS WITHOUT RISK OF DATA CORRUPTION TO A SHARED RESOURCE FOR SUBSEQUENT PROCESSES

(75) Inventors: Craig Russ, Berwyn, PA (US); Steven Clarke, Newtown Square, PA (US); Stephen Bartels, West Chester, PA (US)

(73) Assignee: Unisys Corporation, Blue Bell, PA (US)

(*) Notice: Subject to any disclaimer, the term of this patent is extended or adjusted under 35 U.S.C. 154(b) by 800 days.

(21) Appl. No.: 09/992,914

(22) Filed: Nov. 14, 2001

(51) Int. Cl.[7] .............................................. G06F 11/00
(52) U.S. Cl. ........................... 714/24; 714/51; 714/55
(58) Field of Search ............................. 714/24, 47, 51, 714/55; 711/147; 707/201

(56) References Cited

U.S. PATENT DOCUMENTS

| | | | |
|---|---|---|---|
| 5,781,770 A * | 7/1998 | Byers et al. ................. | 713/502 |
| 5,815,702 A * | 9/1998 | Kannan et al. .............. | 712/244 |
| 5,835,763 A * | 11/1998 | Klein .......................... | 718/101 |
| 5,872,981 A * | 2/1999 | Waddington et al. ....... | 710/200 |
| 6,243,860 B1 * | 6/2001 | Holland ....................... | 717/141 |
| 6,269,478 B1 * | 7/2001 | Lautenbach-Lampe et al. ........................... | 717/127 |
| 6,553,512 B1 * | 4/2003 | Gibson ........................ | 714/17 |

FOREIGN PATENT DOCUMENTS

JP         401213727 A  *  8/1989  ........... G06F 11/30

* cited by examiner

Primary Examiner—Bryce P. Bonzo
Assistant Examiner—Gabriel L. Chu
(74) Attorney, Agent, or Firm—Lise A. Rode; Mark T. Starr; Woodcock Washburn

(57) ABSTRACT

A stack frame associated with a procedure that can alter or affect a shared resource where the procedure is associated with a child stack and is declared by a parent stack is marked isolated. Isolated stack frames are allotted an additional predefined interval of processing time before commands such as terminate and interrupt applied to the child stack are executed. If the command is a terminate command, after the additional allotted time interval has passed, both child and parent stacks are terminated. If the command is an interrupt command, after the additional allotted time interval has passed, the child stack is interrupted. If the command is a resource-terminated command, an operator is permitted to allocate more resource time to the task or may terminate both parent and child stacks. If a parent stack is terminated, all child stacks of the parent are terminated.

24 Claims, 3 Drawing Sheets

TERMINATING A CHILD PROCESS WITHOUT RISK OF DATA CORRUPTION TO A SHARED RESOURCE FOR SUBSEQUENT PROCESSES

FIELD OF THE INVENTION

This invention relates to the field of computer systems and in particular to maintaining system integrity in an environment in which multiple procedures can alter or affect a shared resource.

BACKGROUND

In operating systems that utilize stacks to keep track of multiple environments, it is currently very difficult to manage a shared resource having a global state in such a way that client stacks can be terminated without a significant possibility of corrupting the resource's global state and/or leaving resources locked. Several mechanisms (e.g., housekeeping procedures) currently exist and partially address this problem. Typically, however, such mechanisms are obscure, awkward, and hard to use. Such mechanisms may also be incomplete, leaving small windows of time in which terminating a client stack may result in data corruption. Such mechanisms may in addition require special privileges to use, adding complexity and introducing an additional source of user error. Hence, these mechanisms may negatively impact system integrity.

SUMMARY OF THE INVENTION

In accordance with the present invention, a procedure is marked "isolated" if the procedure can alter or affect a shared resource and is running on a stack other than the stack that declared the isolated procedure (parent stack). The execution of a procedure marked "isolated" is not immediately interrupted when the stack the isolated procedure is running on (child stack) is terminated, unless the procedure's parent stack is terminated. An external termination request applied to a child stack is delayed for a predefined period of time. If the delay created by allowing the isolated procedure to run to completion exceeds a configurable threshold, a message is generated to the system console and either the parent environment is terminated or more time is allocated to allow the isolated procedure to run to completion.

The features of the present invention may be used in any environment in which data is exchanged between one program and another, either within the same computer or over a network, where a stack frame running on one stack links lexically to another stack or to multiple other stacks. In particular the invention may be used in the context of shared libraries which have global data protected by locking mechanisms.

Other aspects of the present invention are described below.

BRIEF DESCRIPTION OF THE DRAWINGS

The foregoing summary, as well as the following detailed description of presently preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

Figure 1:
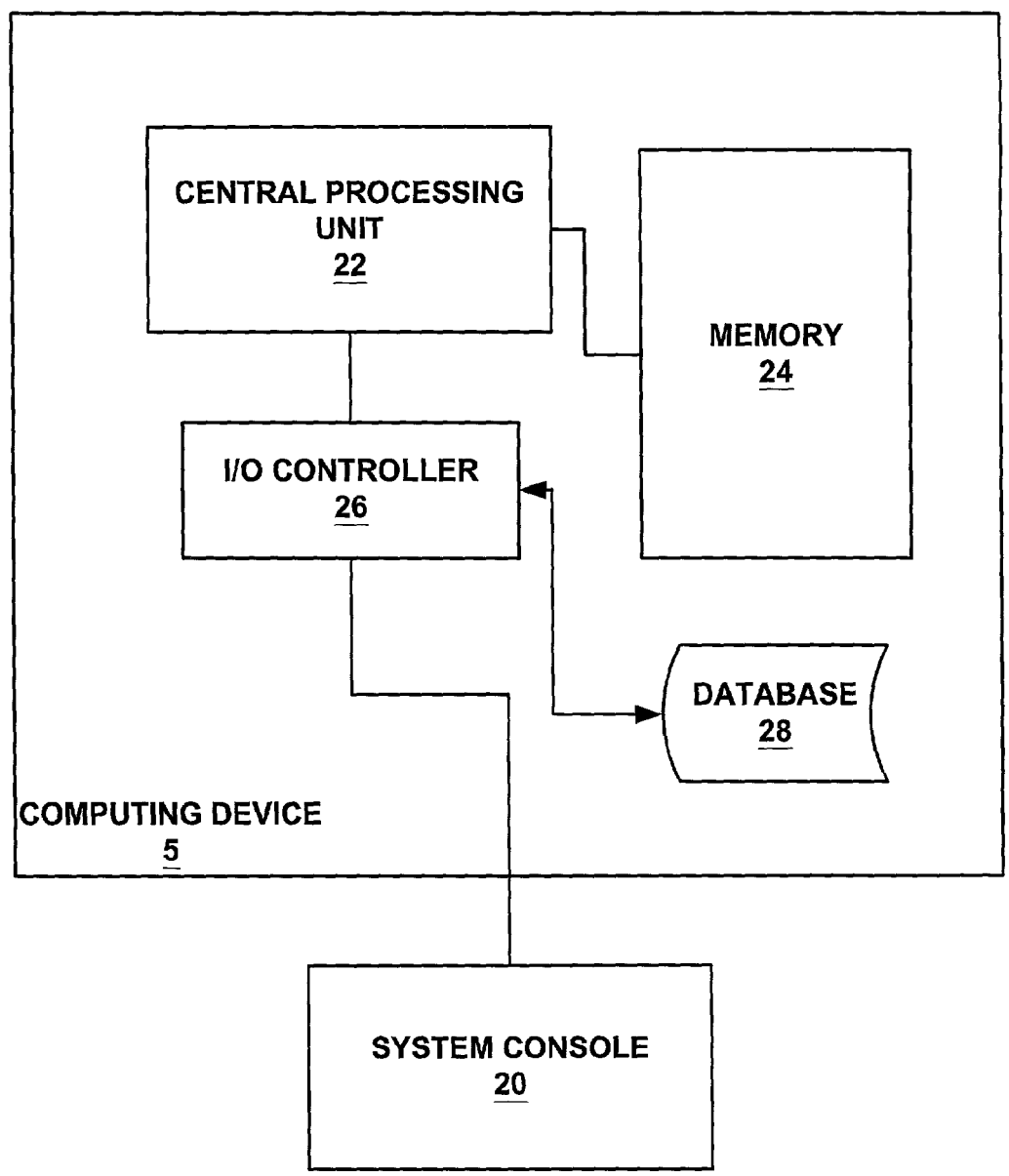
FIG. 1 is a block diagram of an exemplary computing environment in which one embodiment of the invention may be implemented.

FIG. 1 illustrates an exemplary computing environment in which one embodiment of the present invention may be implemented. FIG. 1 illustrates a computing system 10 including system console 20 and computing device 5. Computing device 5 may be comprised of a central processing unit 22, memory 24, I/O controller 26 and database 28 and is capable of executing in a multi-user environment. Database 28 may be internal or external to computing device 5 and may be stored in memory 24 or on a computer-readable medium such as an internal disk, external disk, CD ROM or the like.

Figure 2:
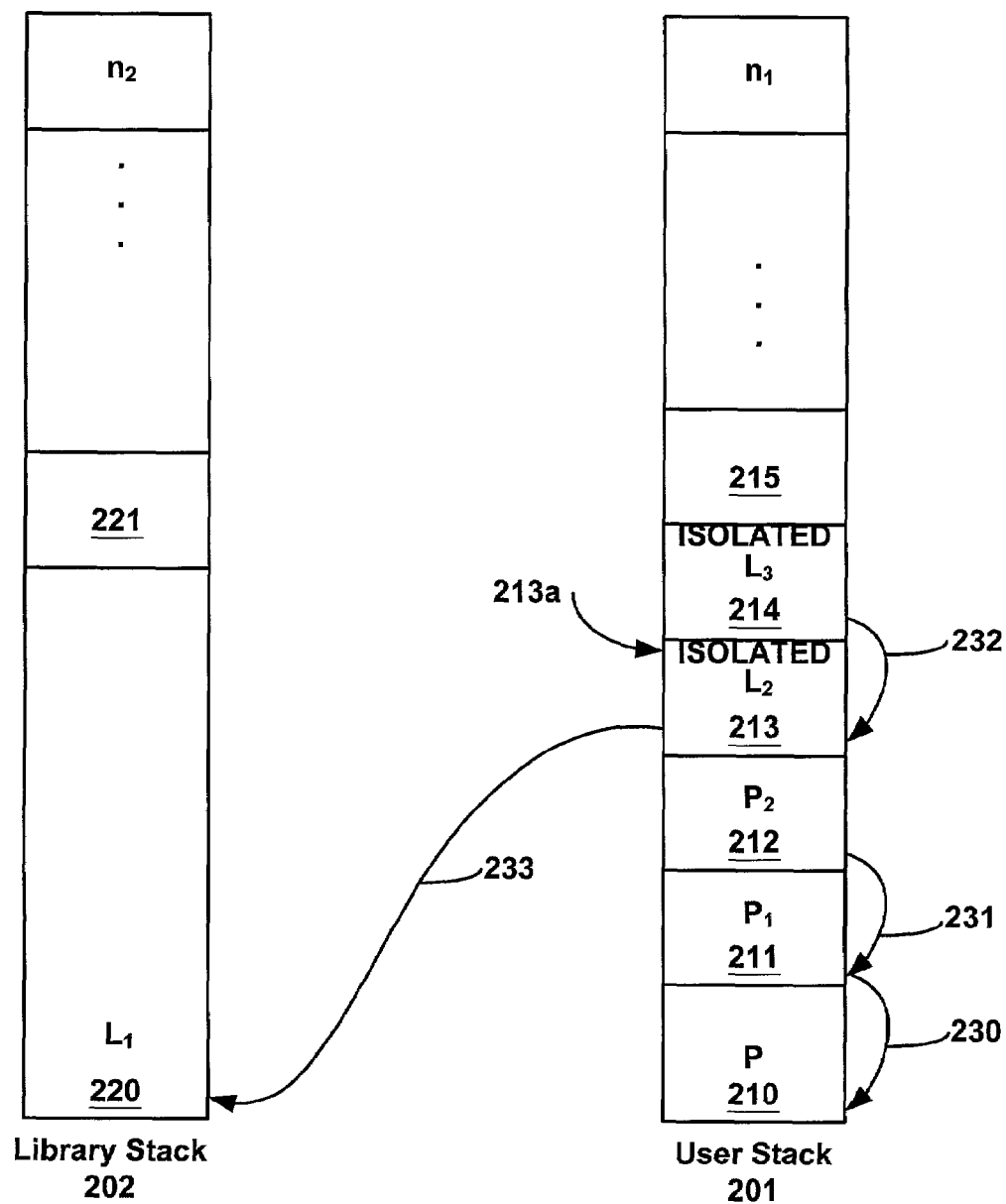
FIG. 2 is an illustration of stacks and lexical links in accordance with one embodiment of the present invention.

FIG. 2 illustrates two exemplary stacks that may be stored in memory 24: user stack 201 and library stack 202. User stack 201 is created when a user program P is initiated. A frame (e.g., frames 210, 211, 212, 213, 214 ... $n_1$,) in user stack 201 is associated with the global environment of program P (frame 210). A separate frame on user stack 201 is associated with each procedure invoked by program P. If a procedure invoked by program P contains a procedure within that procedure, the nested procedure will be associated with a separate frame on the stack, and so on.

Program P may invoke a procedure not contained within program P, but instead contained within Library code. Library stack 202, if not already in existence, is created when an operating system links the library containing a library procedure called by program P to program P.

Within user stack 201 are stack frames 210, 211, 212, 213, 214 ... $n_1$, where $n_1$ represents some finite number of frames that user stack 201 can contain without generating a "stack overflow" condition. Within library stack 202 are stack frames 220, 221 ... $n_2$, where $n_2$ represents some finite number of frames that library stack 201 can contain without generating a "stack overflow" condition.

Within stacks 201 and 202, stack frames 210, 211 ... $n_1$ and 220, 221 ... $n_2$ respectively are numbered to reflect the historical hierarchy of the stack frames within a stack 201 or 202 such that stack frame 210 on stack 201 was created prior to stack frame 211 which was created prior to stack frame 212, and so on. Similarly stack frame 220 on stack 202 was created prior to stack frame 221 and so on.

Execution of stack frames 210, 211 ... $n_1$ proceed from top (stack frame $n_1$) to bottom (stack frame 210) so that processing related to stack frame $n_1$ must be complete before processing related to stack frame $n_1-1$ is completed and so on until the bottom of the stack (frame 210) is reached. When the program completes processing, the bottom frame 210 is terminated and stack 201 is erased from memory 24.

Exemplary links 230, 231, 232 and 233 represent lexical relationships between frames of stacks and between stacks of user stack 201 and library stack 202. Lexical links represent relationships between procedures. If procedure $P_1$ declares procedure $P_2$, a lexical link from the frame associated with procedure $P_2$ to the frame associated with $P_1$ indicates that the code of $P_2$ has access to both it's own data and $P_1$'s data. If procedure $L_1$ declares procedure $L_2$, a lexical link from the frame associated with procedure $L_2$ to the frame associated with $L_1$ indicates that the code of $L_2$ has access to both it's own data and $L_1$'s data.

In FIG. 2, as stated above, exemplary user stack 201 represents a stack that is generated when an instance of a program P is instantiated. Frame 210 represents the static global environment of the instantiated program P. Within the program P code, one or more procedures $P_1, P_2, P_3 \ldots P_n$ may be declared and one or more stack frames may be associated with the one or more procedures. In the example illustrated in FIG. 2, the static global environment (associated with frame 210) has invoked procedure $P_1$ (associated with stack frame 211). The relationship between the static global environment and $P_1$ is represented by lexical link 230, that is, in the example, $P_1$ can directly access data in frames 210 and 211. Similarly, in the example, procedure $P_1$ of program P declared procedure $P_2$. When procedure $P_1$ invokes procedure $P_2$, the relationship between $P_1$ and $P_2$ is denoted by lexical link 231 between the stack frames associated with $P_1$ (frame 211) and $P_2$ (frame 212). As a result of links 231 and 230, $P_2$ can directly access data in frames 212, 211, and 210.

Program P may also invoke a library procedure, such as library procedure $L_2$. In FIG. 2, library procedure $L_2$ (declared by procedure $L_1$) has been invoked by procedure $P_2$ of program P and is associated with user stack 201 frame 213. The relationship between $L_2$ and $L_1$ is denoted by lexical link 233. Similarly, library procedure $L_2$ may invoke library procedure $L_3$ (relationship between $L_2$ and $L_3$ denoted by link 232) and so on. Library stack 202 is referred to as a parent stack because the library code running in stack 202 declares procedure $L_2$. Similarly, a stack such as user stack 201 which calls a procedure declared by another stack ($L_2$ associated with stack 201 is declared by $L_1$ associated with stack 202) is referred to as a child stack.

Typically, when the execution of a program such as program P is terminated or interrupted, only historical links (not lexical links) are considered, causing problems when lexical links go between programs (as is shown in FIG. 2 by lexical link 233). Assume, for example, that program P running on user stack 201 calls library procedure $L_2$ to add $20.00 to employee Joe's salary amount stored in shared database D 28. Assume further that Library program $L_1$, running on library stack 202, controls access to database D 28. Thus when user program P wants to add $20.00 to Joe's salary, user program P invokes a library service such as procedure $L_2$. Library code in procedure $L_2$ finds Joe's record, locks it (to prevent another program from simultaneously attempting to update Joe's record) and stores the salary data from Joe's record onto library stack 202 frame 220. Procedure $L_2$ adds $20.00 to Joe's salary data on stack 202 frame 220 and procedure $L_1$ fetches the updated salary data from frame 220 of library stack 202, writes Joe's new salary data in database D 28 and unlocks the lock on Joe's record.

Typically, if program P running on user stack 201 is terminated, procedure $L_2$ associated with stack 201 is immediately terminated, but procedure $L_1$ and library stack 202 are not terminated, thus resulting in problems. For example, if procedure $L_2$ is terminated after the lock on Joe's record is obtained, but before Joe's record is unlocked, Joe's record may become inaccessible to other user programs, that is, the database resource (Joe's record) stays locked. Similarly, if a terminate command for stack 201 is received before procedure $L_2$ completes, corruption of database D 28 may result because any data in stack frame 220 being modified by stack frames 213, 214 $\ldots n_1$ is left in an indeterminate state.

Maintaining System Integrity When Child Stacks are Terminated or Interrupted

The present invention may be used in any situation where a shared resource exists and mechanisms are employed to control access to the resource. For example, the present invention may be used in the context of shared libraries wherein global data is protected by locking mechanisms. One example of a system including shared libraries having global data protected by locking mechanism is a system that uses a DLL (Dynamic Linked Library). A DLL is a library of procedures. In such a system, a program may dynamically invoke or call a procedure maintained in the library of procedures. Thus the library procedure will be associated with a user stack during execution even though the library procedure is declared by a procedure associated with the library stack. The following example is directed to such a system although it will be understood that the example chosen for illustration is exemplary only and the present invention is not limited thereto.

If a procedure can alter or affect a shared resource, that procedure should be denoted "isolated" within the source code of the procedure. When an operating system in accordance with one embodiment of the present invention sets up the stacks associated with a task that uses the isolated procedure, the program's code marks the frame of the stack associated with the isolated procedure by associating a software control word (SCW) with the frame, if one is not already associated therewith. At least one of a plurality of bits in the SCW is set to indicate that the frame is isolated.

For example, in accordance with the present invention, one or more of stack frames 210, 211, 212, 213, 214 $\ldots n_1$ of user stack 201 may be an isolated frame and therefore be associated with an SCW with its isolated bit set. In the specific example illustrated in FIG. 2 frames 213 and 214 are isolated frames. If the frame is isolated, a bit designated as the isolated bit in an SCW is set to indicate that the frame is isolated 213a. The SCW is associated with the isolated frame. It should be understood that although the use of an SCW is presently preferred, other methods of marking a frame isolated could easily be employed and are contemplated by the invention.

Figure 3:
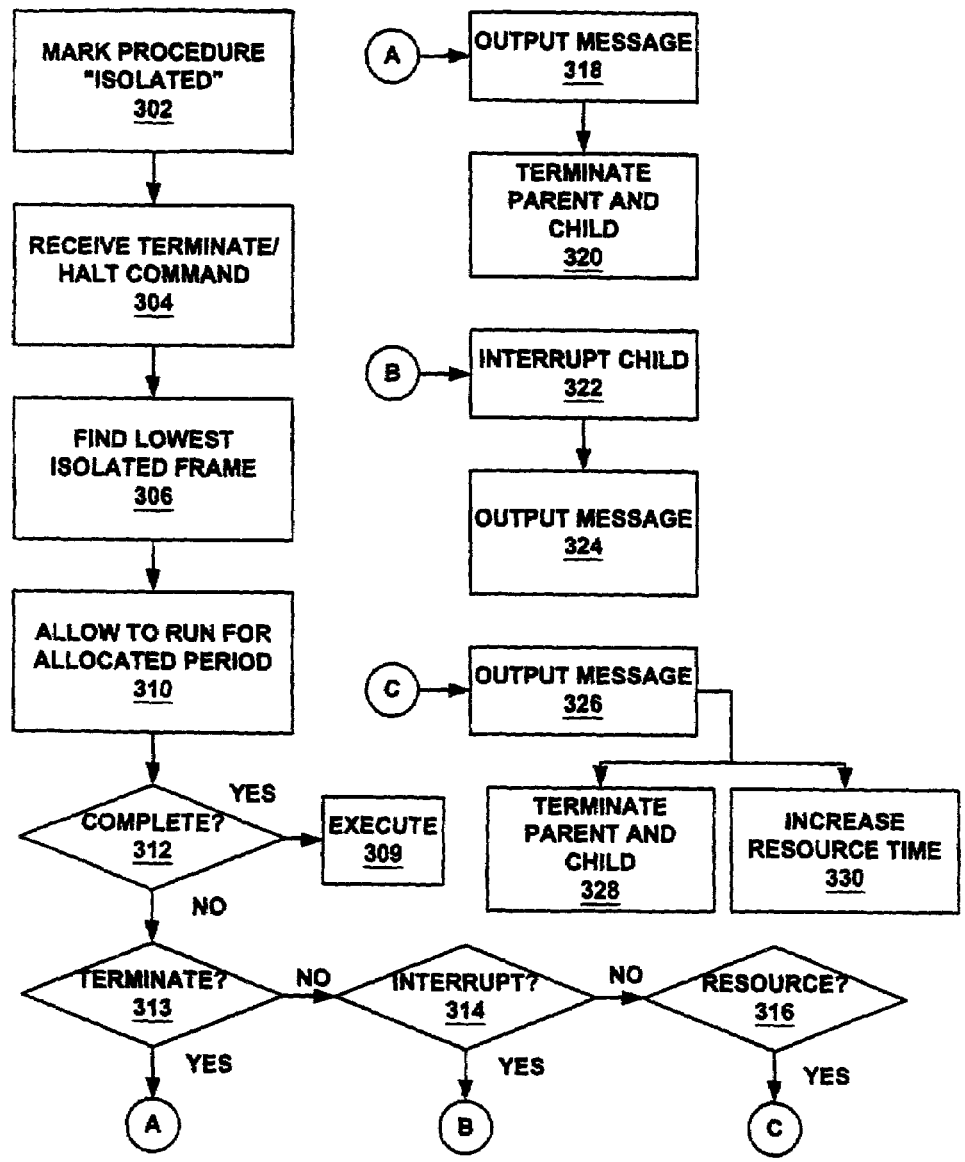
FIG. 3 is a flow diagram of a method for maintaining isolated environments in accordance with one embodiment of the invention.

FIG. 3 illustrates a process for maintaining isolated environments in accordance with one embodiment of the present invention. At step 302 frame 213 to which procedure $L_2$ is associated, is marked "isolated" 213a. In step 304 an operating system controlling the execution of tasks receives a command directed to user stack 201. Various commands may be entered by a system operator or may be automatically generated by an operating system to control the execution of jobs. Included in the commands are commands referred to herein as "terminate", "interrupt" and "resource-terminated" commands. A "terminate" command, as used herein, is any command issued to kill or discontinue a task executing on a system. An "interrupt" command, as used herein, is any task interrupt command, issued to stop the execution of the task but enabling execution to resume when an appropriate command is entered. A "resource-terminated" command, as used herein, is any command issued to kill a task executing on a system because a resource has been allocated to a task for a specific period of time and that time period has elapsed, or because the task has attempted to exceed some limit (quota) which has been established on its use of some resource.

At step 306, each frame in user stack 201 is examined for the presence of an SCW. If an SCW exists for the frame, the isolated bit is checked to see if the frame is isolated. Each frame $n_1 \ldots 210$ in terminated/interrupted/resource-terminated stack 201 from the top frame (frame $n_1$) to the bottom frame (frame 210) is sequentially examined to see if the frame is marked "isolated". If the frame (e.g., $n_1$), is not marked "isolated", the next frame (e.g., $n_1-1$) in stack 201 is examined. In one embodiment this process is repeated until the lowest frame in user stack 201 marked "isolated" is found.

In this embodiment of the present invention, if a child stack running an isolated procedure is terminated, interrupted, or resource-terminated, the child stack running the isolated procedure will be terminated, interrupted, or resource-terminated below the lowest stack frame marked "isolated". Thus, a request to terminate user stack 201 is postponed for a predefined period of time until stack frame 213 (the lowest stack frame marked "isolated" in the example illustrated in FIG. 2) has terminated normally or until library stack 202 is terminated. An isolated procedure is thus protected from terminate, interrupt or resource-terminated commands applied to the stack running the isolated procedure.

For example, in FIG. 2, frame 213 is the lowest frame marked "isolated". When it is detected that frame 213 associated with "isolated" procedure $L_2$ is the lowest frame marked "isolated", the execution of the command for user stack 201 is postponed for a configurable interval of time. In a preferred embodiment, a predetermined period of time, preferably a configurable interval of time, is predefined as a range of 4 to 6 seconds of CPU processing time. More preferably, the predefined period of time is 5 CPU seconds, that is, 5 seconds of CPU processing time. Alternately, the predefined interval of time is a range of 4 to 6 seconds of elapsed time. If user stack frame 213 completes successfully in the allotted time, no loss of data integrity will occur, and any remaining incompletely processed frames below frame 213 can be terminated without substantial risk of data corruption.

In an alternative embodiment, each frame from the top frame (frame $n_1$) to the bottom frame (frame 210) is sequentially examined to see if the frame is marked "isolated" and the highest frame marked isolated is found. The highest isolated frame would be the first isolated frame found in user stack 201.

In this case, if a child stack running an isolated procedure is terminated, interrupted, or resource-terminated, the child stack running the isolated procedure will not be terminated, interrupted, or resource-terminated until an additional predefined interval of processing time is allotted to each frame marked "isolated". Thus, for example, if user stack 201 contained 2 frames (frames 213 and 214, for instance) marked "isolated", a request to terminate user stack 201 would be postponed until stack frame 214 received an additional predefined period of time to complete successfully and until frame 213 received an additional predefined time period to complete successfully.

In this embodiment, if frame 214 is the highest frame marked "isolated", the execution of the command for user stack 201 is postponed for a configurable interval or time (e.g., five CPU seconds). If frame 214 completes successfully in the allotted time, but frame 213 has not completed successfully, the risk of data corruption has not been eliminated and an additional interval of time may be allotted to frame 213 to complete. This procedure may continue until the lowest frame marked isolated has been allotted an additional period of time to complete successfully.

Referring again to FIG. 3, assume that user stack 201 containing a frame (e.g., frame 213), marked isolated in step 302 receives a command such as, but not limited to, a terminate, interrupt or resource-terminated command at step 304. The lowest isolated frame is determined in step 306. Before executing the command, user stack 201 receives an additional predefined period of time at step 310 to allow frame 213 to complete processing. If frame 213 successfully completes before the end of the predefined period of time (e.g., five CPU seconds) (step 312), the command can be executed without fear of data corruption (step 309).

If the procedure associated with frame 213 has not successfully completed processing (step 312) and the command received was a terminate command (step 313), a message will be displayed on the system console (step 318). The message indicates that the stack has been terminated but is running isolated code from a task identified, for example, by a task identification number or is running isolated code from a library identified, for example, by a library identification number and has consumed the predefined number of seconds of processor time since it was terminated, without exiting isolated code. To terminate user stack 201 before the procedure exits, an operator terminates both child stack 201 and parent stack 202 (step 320) by terminating the identified task or library, which also terminates all other programs using the identified task or library.

If the procedure associated with frame 213 has not successfully completed processing (step 312) and the command received was an interrupt command (step 314), the interrupt command takes effect as if the frame were not marked isolated (step 322), that is, the child stack (user stack 201) is interrupted, and a message is displayed on the system console (step 324). The message indicates that the stack has been stopped, but is running isolated code from an identified task or library and has consumed X (e.g., 5) seconds of processor time since it was interrupted, without exiting isolated code. The processing of user stack 201 may resume upon entry of the appropriate resume command.

If the procedure associated with frame 213 has not successfully completed processing (step 312) and the command received was a resource-terminated command (step 316), a message will be displayed on the system console (step 326). In this case the isolated frame 213 is running on a stack 201 that has received a terminate command because the time allotted to a resource has been exceeded. The message will indicate that processing has been stopped because it has exceeded a resource limit while running isolated code from an identified task or library. The operator may authorize further resource usage or terminate the identified task or library and all other tasks using the identified task or library.

If isolated frame 213 continues to run for the allotted time on a resource-terminated stack (the time limit for the resource has been exceeded), a message (step 326) requiring operator response will enable an operator to override the resource limit (step 330) or to terminate parent/library stack 202 and child/user stack 201 (step 328).

If an isolated procedure running in a frame fails to complete successfully while running on a stack other than the stack that declared the isolated procedure the parent stack will be terminated. Failure to complete successfully includes encountering a fatal error in an isolated procedure or in procedures invoked above the isolated procedure. Failure to complete successfully may also result from a GO TO command that incorrectly cuts back the stack environment of the isolated procedure.

Terminating a stack that declares a procedure (a parent stack) results in the termination of all stacks running the procedure, including the procedures marked "isolated". For example, if library stack 202 is terminated, user stack 201 is likewise terminated. It should be understood that, although in the example cited, only one library is invoked from user stack 201, the present invention includes within its scope the use of multiple libraries.

CONCLUSION

The programming necessary to effectuate the processes performed in connection with the present invention is relatively straightforward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful mechanism for maintaining isolated environments. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method for maintaining system integrity in a multiple user environment, the method comprising:
   marking a first procedure associated with a first stack if the first procedure can affect a resource shared between the first procedure and a second procedure, wherein the first procedure is declared by the second procedure associated with a second stack; and
   in response to an external command associated with the first procedure to perform one of process termination and process interruption, allotting a predefined period of time for the marked first procedure to complete before executing the external command;
   wherein completion of the marked first procedure allows execution of the external command without risk of data corruption in the shared resource for subsequent processes.

2. The method of claim 1, further comprising postponing execution of the external command for the predetermined period of time.

3. The method of claim 1, wherein allotting a predefined period of time comprises allotting a range of 4 to 6 seconds of CPU processing time.

4. The method of claim 1, further comprising issuing a message to a system console.

5. The method of claim 1, further comprising terminating the first procedure and the second procedure.

6. The method of claim 1, further comprising receiving a command to increase a resource allocation amount by a predefined amount of time if the external command is a process termination command related to the shared resource.

7. The method of claim 6, further comprising postponing execution of the external command for a specified period of time.

8. A method for maintaining system integrity in a computer system, comprising:
   associating a first procedure with a child stack, the first procedure having an associated second procedure, wherein the second procedure is a parent procedure and is associated with a parent stack; and
   in response to receiving a command associated with the first procedure, permitting the first procedure to continue processing for a predetermined period of time, before executing the command;
   wherein the first procedure can affect a resource shared between the first procedure and a second procedure and wherein completion of the first procedure allows execution of the command without risk of data corruption in the shared resource for subsequent processes.

9. The method of claim 8, wherein the command is one of a command to terminate and a command to interrupt the first procedure.

10. The method according to claim 9, wherein the interrupt command is issued because a time allotted to the resource has elapsed.

11. The method according to claim 10, wherein the time allotted to the resource is extended for a specified period of time.

12. The method according to claim 9, wherein the first procedure and the second procedure are terminated.

13. The method according to claim 9, wherein the interrupt command is executed.

14. The method according to claim 8, wherein a message is issued to a system console.

15. The method of claim 8, wherein the child stack is comprised of at least one of a plurality of frames, wherein the at least one frame is associated with a procedure.

16. The method of claim 15, wherein the at least one of a plurality of frames are processed in order from top to bottom.

17. The method of claim 16, wherein the at least one frame is marked isolated.

18. A method for maintaining system integrity in a computer system, comprising:
   associating a first procedure with a child stack, the first procedure having an associated second procedure, wherein the second procedure is a parent procedure and is associated with a parent stack; and
   in response to receiving a terminate command associated with the second procedure, terminating the first procedure;
   wherein the first procedure can affect a resource shared between the first procedure and a second procedure, and wherein completion of the first procedure allows execution of the command without risk of data corruption in the shared resource for subsequent processes.

19. A system for maintaining system integrity comprising:
   a memory for storing and manipulating stacks; and
   a central processing unit that executes computer-readable instructions for maintaining system integrity in a multiple user environment, the computer-readable instructions including instructions for:
   associating a first procedure with a child stack, the first procedure having an associated second procedure, wherein the second procedure is a parent procedure and is associated with a parent stack;
   in response to receiving a command associated with the first procedure, before executing the command, permitting the first procedure to continue processing for a predetermined period of time;
   wherein the first procedure can affect a resource shared between the first procedure and a second procedure, and wherein completion of the first procedure allows execution of the command without risk of data corruption in the shared resource for subsequent processes.

20. The system of claim 19, wherein the command associated with the first procedure is one of a command to terminate the first procedure and a command to interrupt the first procedure.

21. The system of claim 20, wherein the computer-readable instructions comprise further computer-readable instructions to terminate the first procedure and the second procedure if the first procedure does not complete execution within the predetermined period of time.

22. The system of claim 20, wherein the command associated with the first procedure is the command to interrupt the first procedure.

23. The system of claim 22, wherein the computer-readable instructions include further computer-readable instructions for interrupting the first procedure if the first procedure does not complete execution within the predetermined period of time.

24. A computer-readable medium containing computer-executable instructions for performing the method of:
 associating a first procedure with a child stack, the first procedure having an associated second procedure, wherein the second procedure is a parent procedure and is associated with a parent stack; and
 in response to receiving a command associated with the first procedure, permitting the first procedure to continue processing for a predetermined period of time, before executing the command;
 wherein the first procedure can affect a resource shared between the first procedure and a second procedure and wherein completion of the first procedure allows execution of the command without risk of data corruption in the shared resource for subsequent processes.

* * * * *